(12) United States Patent
Huang et al.

(10) Patent No.: US 12,741,352 B2
(45) Date of Patent: Sep. 22, 2026

(54) FIVE-AXIS SPATIAL PRECISION MEASUREMENT FIXTURE

(71) Applicant: Industrial Technology Research Institute, Hsinchu (TW)

(72) Inventors: Yu-Shiang Huang, Taichung City (TW); Chin-Mou Hsu, Taichung City (TW); Tsung-Yu Yang, Taichung City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 269 days.

(21) Appl. No.: 18/787,650

(22) Filed: Jul. 29, 2024

(65) Prior Publication Data

US 2025/0367775 A1 Dec. 4, 2025

(30) Foreign Application Priority Data

May 29, 2024 (TW) ................................ 113119833

(51) Int. Cl.
*B23Q 17/22* (2006.01)
*B23Q 1/25* (2006.01)

(52) U.S. Cl.
CPC ............... *B23Q 17/22* (2013.01); *B23Q 1/25* (2013.01); *B23Q 2717/00* (2013.01)

(58) Field of Classification Search
CPC ...... B23Q 17/22; B23Q 1/25; B23Q 2717/00; B23Q 17/00; G01B 5/008; G01B 5/0004
See application file for complete search history.

(56) References Cited

U.S. PATENT DOCUMENTS 5,111,590 A 5/1992 Park
6,772,619 B2 8/2004 Nashiki
7,174,652 B2 2/2007 Mcmurtry
9,753,449 B2 9/2017 Sato
(Continued)

FOREIGN PATENT DOCUMENTS

CN 101976057 B 12/2012
CN 101992407 B 8/2014
(Continued)

OTHER PUBLICATIONS

TW OA issued on Jan. 7, 2025.
(Continued)

*Primary Examiner* — Thomas M Hammond, III
(74) *Attorney, Agent, or Firm* — WPAT, PC

(57) ABSTRACT

A five-axis spatial precision measurement fixture includes a body and a base. The body has a first side, a second side and a third side. The first side is parallel to a first direction and has two opposite ends connecting to the second side and the third side. The included angles between the first side and the second side and third side respectively are 45 degrees. The included angle between the second side and the third side is 90 degrees. At least three mounting holes are provided on a first surface of the body to install a sphere respectively. A center line of the at least three mounting holes is parallel to the first direction, and distances between centers of any two adjacent mounting holes are the same. The body is pivotably disposed on the base and mounted on the working table of the five-axis machine tool.

5 Claims, 11 Drawing Sheets

(56) References Cited

U.S. PATENT DOCUMENTS

| | | | | |
|---|---|---|---|---|
| 11,175,130 | B2 | 11/2021 | Maier | |
| 2003/0127605 | A1 | 7/2003 | Kondo | |
| 2015/0292852 | A1 | 10/2015 | Oki | |
| 2017/0254630 | A1* | 9/2017 | Sakai | G01B 21/042 |
| 2018/0178339 | A1 | 6/2018 | Hwang et al. | |
| 2020/0230771 | A1* | 7/2020 | Kasahara | B23Q 15/22 |

FOREIGN PATENT DOCUMENTS

| | | | | | |
|---|---|---|---|---|---|
| CN | 106489192 | A | | 3/2017 | |
| CN | 106931915 | | | 7/2017 | |
| CN | 105136031 | B | | 9/2017 | |
| CN | 108340210 | A | * | 7/2018 | B23Q 17/00 |
| CN | 109240214 | B | | 4/2020 | |
| CN | 111251072 | | | 6/2020 | |
| CN | 110418938 | B | | 1/2022 | |
| CN | 116967840 | | | 10/2023 | |
| CN | 115805458 | B | * | 3/2025 | |
| JP | 2005-081444 | | | 3/2005 | |
| JP | 2011-137812 | | | 7/2011 | |
| TW | I378843 | | | 12/2012 | |
| TW | I694238 | B | | 5/2020 | |
| TW | 202026589 | A | | 7/2020 | |
| TW | I754563 | B | | 2/2022 | |
| TW | I820809 | B | | 11/2023 | |
| TW | I863612 | | | 11/2024 | |

OTHER PUBLICATIONS

JP OA issued on Dec. 16, 2025.

Fu, “Establishment Value-Added Plan for Measurement Standards of The Smart Machinery Industry” Oct. 2021, Journal: Final Results Report of The Science and Technolgoy Project of the Ministry of Economic Affairs, Taiwan.

Jiao et al. “The accuracy measurement and compensation method for high-end machine tools”, Feb. 24, 2022, Journal: Machinery Industry Magazine.

Paung, “Measurement and improvement of dynamic errors of 5-axis CNC machine tool”, Jun. 2017, Journal: Dissertation & Theses of National Tsing Hua University, Taiwan.

Wu, “Study on the Volumetric Accuracy Measurement and Compensation ofMachine Tools”, Dec. 2019, Journal: Machinery Industry Magazine (vol. 12, No. 411).

Lin, “Synchronous Measurement and Verification of Position-Independent Geometric Errors and Position-Dependent Geometric Errors of Rotary Axes on Five-Axis Machine Tools”, Publication Date: Jul. 2022, National Cheng Kung University, Taiwan.

Guo et al. “Geometric Error Analysis and Compensation of Rotary Axes of Five-axis Machine Tools”, May 2020, Journal: Engineering Science and Technology.

* cited by examiner

FIVE-AXIS SPATIAL PRECISION MEASUREMENT FIXTURE

CROSS REFERENCE TO RELATED APPLICATION

This application claims the benefits of Taiwan application Serial No. 113119833, filed on May 29, 2024, the disclosures of which are incorporated by references herein in its entirety.

TECHNICAL FIELD

The disclosure relates to the field of processing technology, and in particular, to a five-axis spatial precision measurement fixture to quickly perform precision measurement and compensation on the five-axis machine tool.

BACKGROUND

Due to the demand for five-axis high-precision machining driven by the global energy transition and aerospace industry, in order to save labor and improve the precision of surface machining, operators have invested in the development of five-axis machining equipment, so that workpieces can be clamped at once to complete the complex cutting process, and through spatial geometric algorithms for interpolation, to carry out high-precision and high-quality machining of products such as turbine blades and artificial joints for achieving optimal performance requirements.

The traditional five-axis precision measurement method requires the integration of laser interferometer, pointer gauge in association with expensive equipment such as large straight gauges, square gauges, and circular testers, to perform the measurement items of 43 errors in total including 21 errors of linear axes and 22 errors of two rotational axes for completing the whole measurement and accuracy correction and adjustment, which is not only complicated but also a time-consuming process.

Furthermore, when using precision measurement fixtures to measure the five-axis machine tools, the fixture must be moved multiple times depending on the measurement items, which is time-consuming and labor-intensive. In addition, measurement deviations due to difference in operator experience and methods are inevitable.

Accordingly, how to develop a "five-axis spatial precision measurement fixture" to quickly execute precision measurement and compensation work on five-axis machine tools is an urgent issue for people in the relevant technical field to solve.

SUMMARY

In one embodiment, the disclosure proposes a five-axis spatial precision measurement fixture, which includes a body, having a first side, a second side and a third side, wherein the first side is parallel to a first direction and has two opposite ends, the second side and the third side are connected to the opposite ends of the first side respectively, there is a first included angle between the first side and the second side, there is a second included angle between the first side and the third side, there is a third included angle between the second side and the third side, the first included angle and the second included angle are both 45 degrees, and the third included angle is 90 degrees, at least three mounting holes are provided on a first surface of the body, a center line of the at least three mounting holes is parallel to the first direction, and distances between centers of any two adjacent mounting holes are the same; and a base, wherein the body is pivotably disposed on the base, the pivot axis of the body is parallel to a third direction, and the first direction and the third direction are perpendicular to each other.

DETAILED DESCRIPTION

Figure 1:
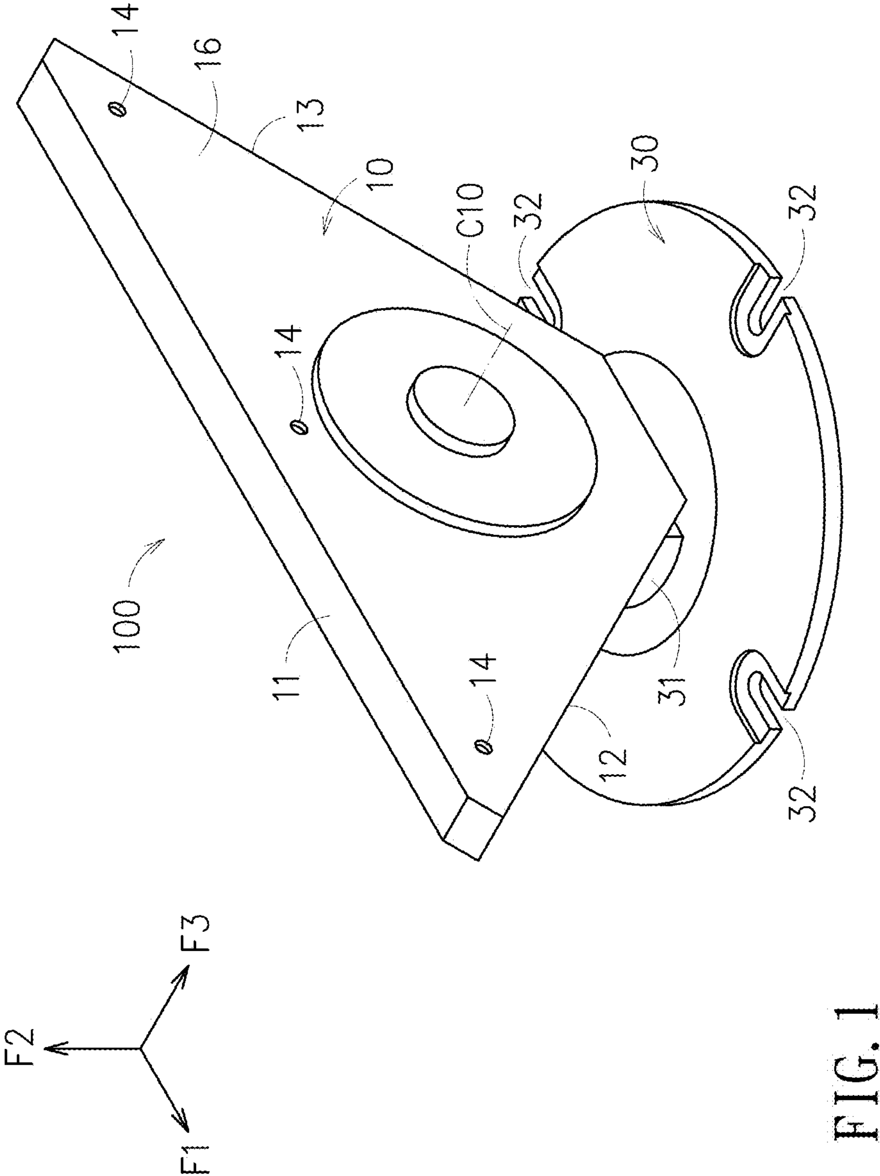
FIG. 1 is a schematic diagram of the three-dimensional structure of an embodiment of the disclosure.

Please refer to FIG. 1 to FIG. 4. The five-axis spatial precision measurement fixture 100 of the disclosure includes, for example, a body 10 and a base 30. The body 10 is made of a material with a low expansion coefficient, such as granite.

Please refer to FIG. 1 to FIG. 4. The body 10 is, for example, a triangular block having a first side 11, a second side 12 and a third side 13, which are not limited by the disclosure. The three sides are all flat surfaces.

The first side 11 is parallel to a first direction F1 and has two opposite ends. The second side 12 and the third side 13 are connected to opposite ends of the first side 11 respectively.

Figure 3:
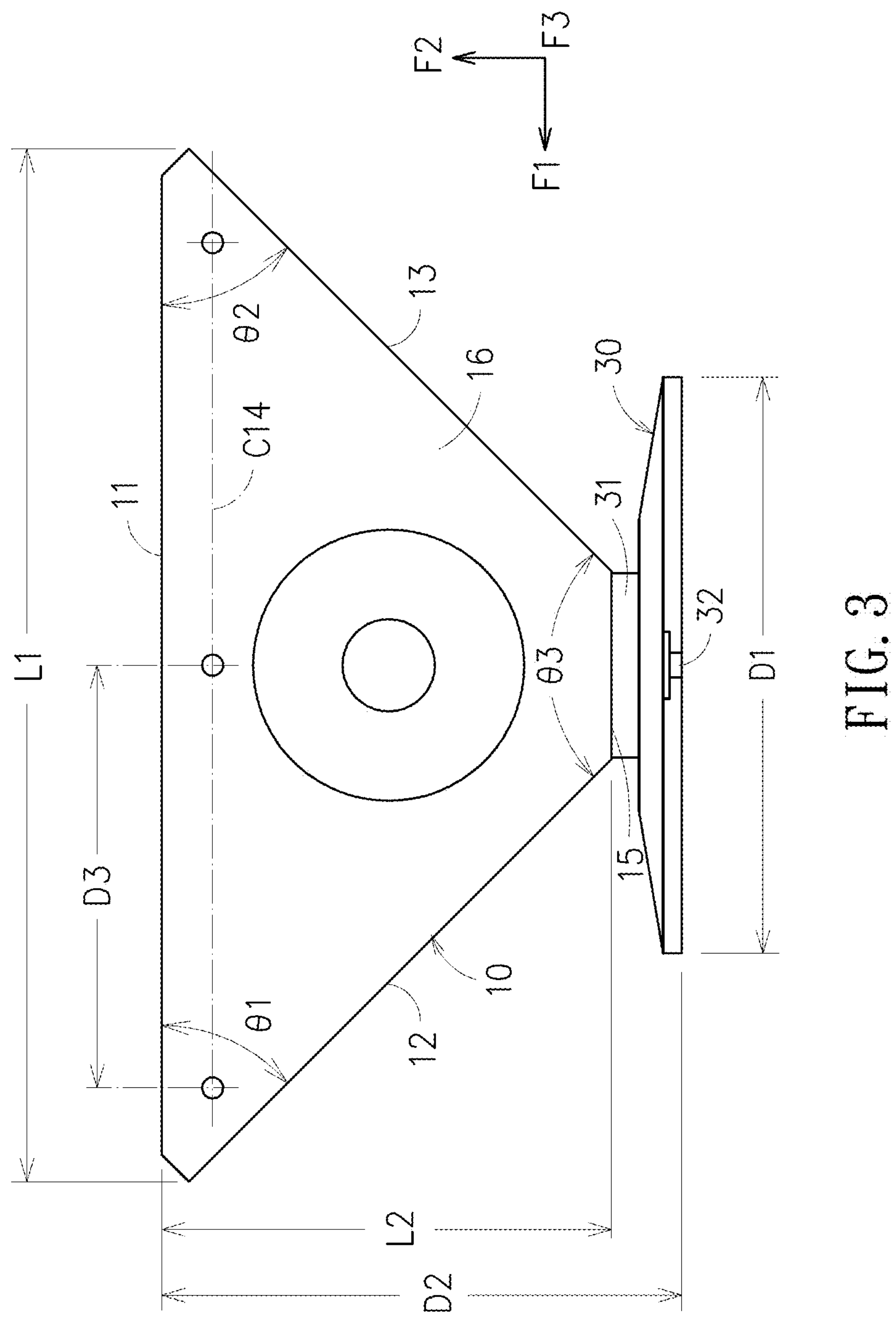
FIG. 3 is a schematic diagram of the front view structure of the embodiment of FIG. 1.

Please refer to FIG. 3. There is a first included angle θ1 between the first side 11 and the second side 12. There is a second included angle θ2 between the first side 11 and the third side 13. There is a third included angle θ3 between the second side 12 and the third side 13. The first included angle θ1 and the second included angle θ2 are both 45 degrees, and the third included angle θ3 is 90 degrees. In this way, the body 10 has the shape of a right triangle.

Figure 4:
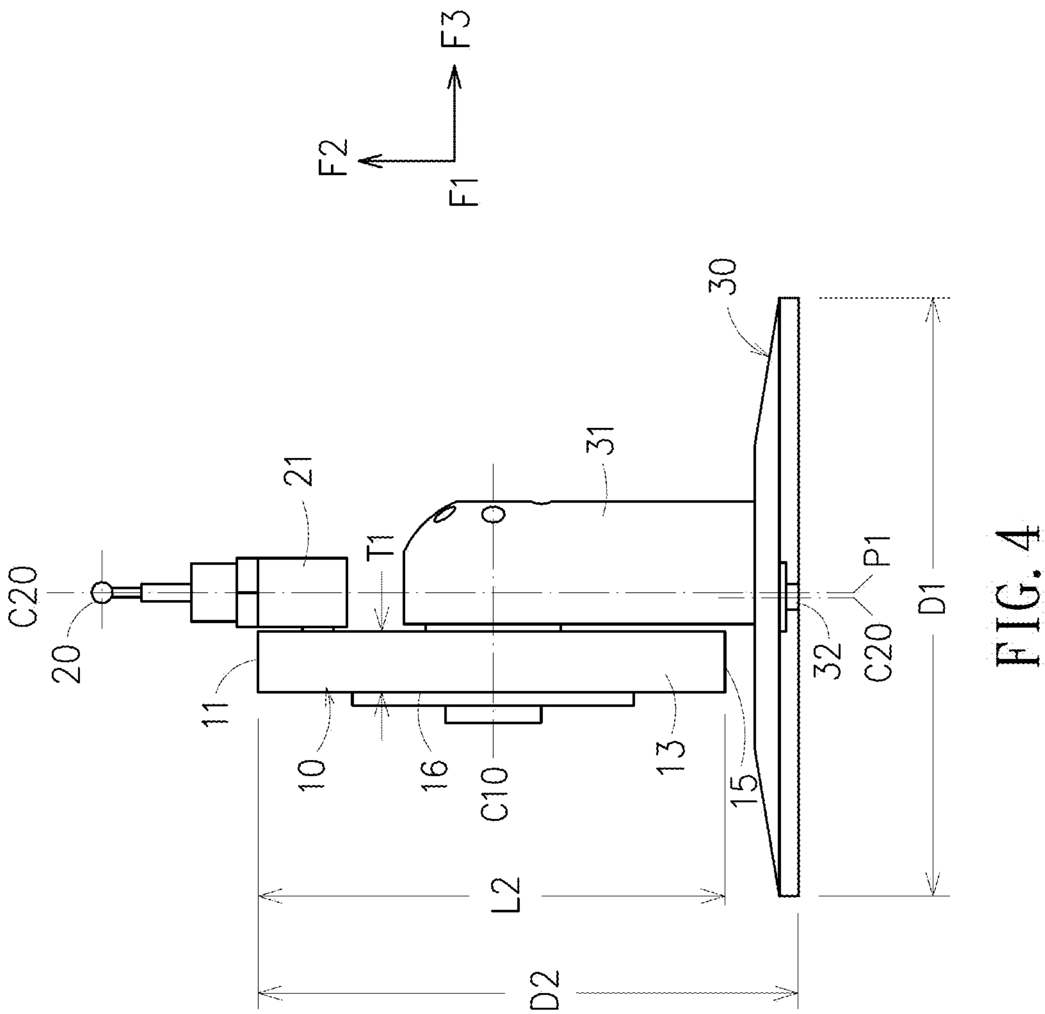
FIG. 4 is a schematic diagram of the right-side view structure with a sphere of the embodiment of FIG. 1.

Please refer to FIG. 1, FIG. 3 and FIG. 4. The body 10 has a first surface 16. The first surface 16 is parallel to a plane formed by a first direction F1 and a second direction F2. The first direction F1 and the second directions F2 are perpendicular to each other. The periphery of the first surface 16 is adjacent to the first side 11, the second side 12 and the third side 13, forming a right-angled triangle.

It should be noted that as shown in the drawings, the joints between the first side 11 and the second side 12, the joints between the first side 11 and the third side 13, and the joints between the second side 12 and the third side 13 of the body 10, all have guide corners. However, the design of these guide corners is not required. For example, the guide corners can be replaced by arc corners, or sharp corners can be maintained.

Figure 2:
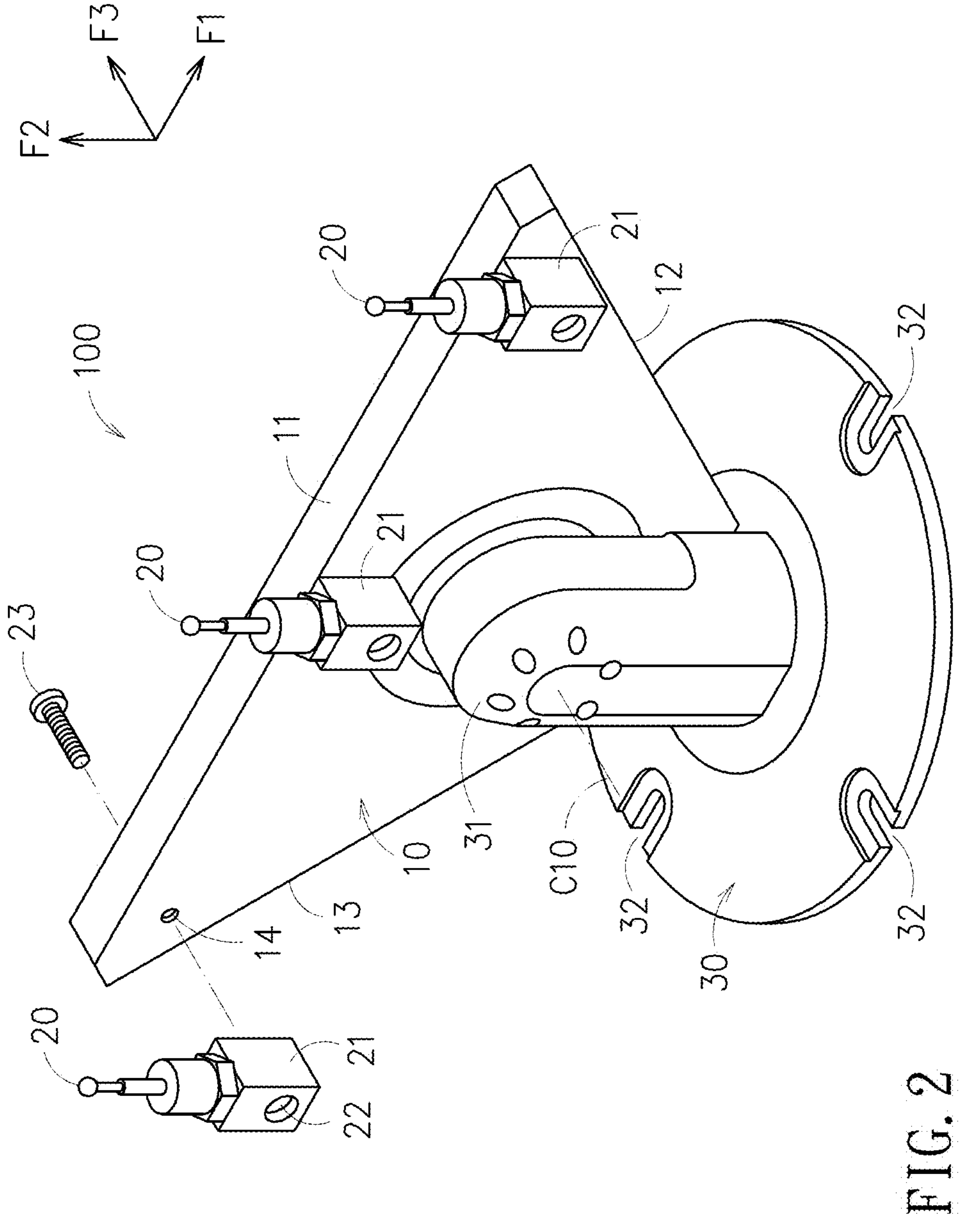
FIG. 2 is a schematic diagram of the three-dimensional structure with a sphere of the embodiment of FIG. 1 from another angle.

Please refer to FIG. 2 and FIG. 3. The first surface 16 of the body 10 is provided with three mounting holes 14, each of which is used to mount a sphere 20. The center connecting line C14 of the three mounting holes 14 is parallel to the first direction F1, and the distance D3 between the centers of any two adjacent mounting holes 14 is the same.

In the embodiment, the axes of the mounting holes 14 are parallel to the third direction F3 and penetrate the body 10. Each sphere 20 has a fixing seat 21, and the fixing seat 21 has a fixing hole 22. The mounting holes 14 and the fixing hole 22 may be, for example, screw holes. The sphere 20 can be fixed on the body 10 by the bolts 23 passing through the corresponding mounting holes 14 and the fixing hole 22.

The sphere 20 is a spherical lens (probe styli, touch probe) of a photoelectric sensor module, that can be used for performing photoelectric non-contact measurement on five-axis machine tools.

Please refer to FIG. 3 and FIG. 4. Each sphere 20 is parallel to the second direction F2 and extends vertically on the first side 11. The distance between the center C20 of each sphere 20 and the first side 11 is the same.

It should be noted that, the connection between the body 10 and the spheres 20 is not limited to the above structure, as long as the spheres 20 can be positioned on the body 10, and the center C20 of each sphere 20 is equal in height and parallel to the first side 11 in the first direction F1. In addition, the number of spheres 20 is not limited to three, but at least three.

Please refer to FIG. 1, FIG. 2, FIG. 4 and FIG. 5. The base 30 is disk-shaped substantially. A cylinder 31 is provided at the top of the base 30, and four positioning holes 32 are provided at the bottom of the base 3. The positioning holes 32 are parallel to the second direction F2 and extend through the base 30.

The body 10 is pivotally mounted on the cylinder 31, so that the body 10 is pivotally mounted on the base 30. The pivot axis C10 of the body 10 is parallel to a third direction F3. The first direction F1, the second direction F2 and the third direction F3 are perpendicular to each other.

Figure 5:
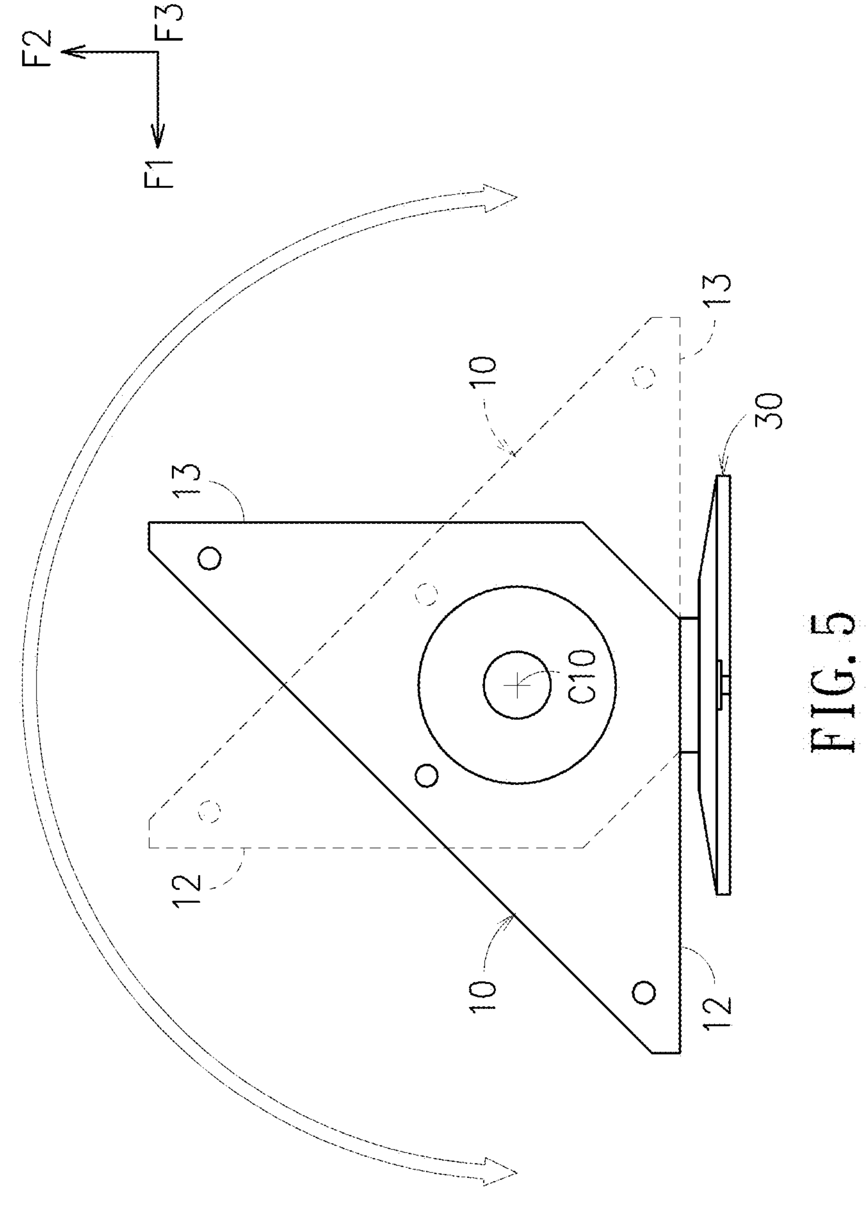
FIG. 5 is a schematic diagram of the structure of the body pivoted on the base according to the embodiment of FIG. 1.

As shown in FIG. 5, the body 10 can rotate around the pivot axis C10, so that the second side 12 or the third side 13 is parallel to the first direction F1. After the body 10 is rotated to a required angle, the body 10 can be fixed by objects or mechanisms such as bolts, hooks, and ratchets to maintain the body 10 at the required angle without rotating.

It should be noted that, the connection between the body 10 and the base 30 is not limited to the above structure, as long as the body 10 can be pivotably positioned on the base 30, and the pivot axis C10 of the body 10 is parallel to the third direction F3. Regarding the relevant dimensions of the body 10, the sphere 20 and the base 30, they depend on the size of the working table of the five-axis machine tool in actual application.

Please refer to FIG. 3 and FIG. 4. For example, if the working table is a circular table with a diameter of 600 mm, the diameter D1 of the base 30 can be 300 mm. That is, the outer diameter of the base 30 can be smaller than the outer diameter of the working table. In addition, the length L1 of the first side 11 may be 537 mm. The distance D2 between the first side 11 and the bottom of the base 30 may be 270 mm. The distance D3 between the centers C14 of two adjacent mounting holes 14 may be equidistant of the same 220 mm, but may also be unequal. The length L2 from the first side 11 of the body 10 to the bottom edge 15 of the body 10 may be 233 mm, and the thickness Tl of the body 10 may be 30 mm.

There is no restriction on the downward projection position of the center C20 of the sphere 20. As shown in FIG. 4, the projection position PI of the center C20 of the sphere 20 is misaligned with the center C30 of the base 30. However, it is not limited thereto. For example, the projection position PI can fall on the center C30 of the base 30.

Figure 6:
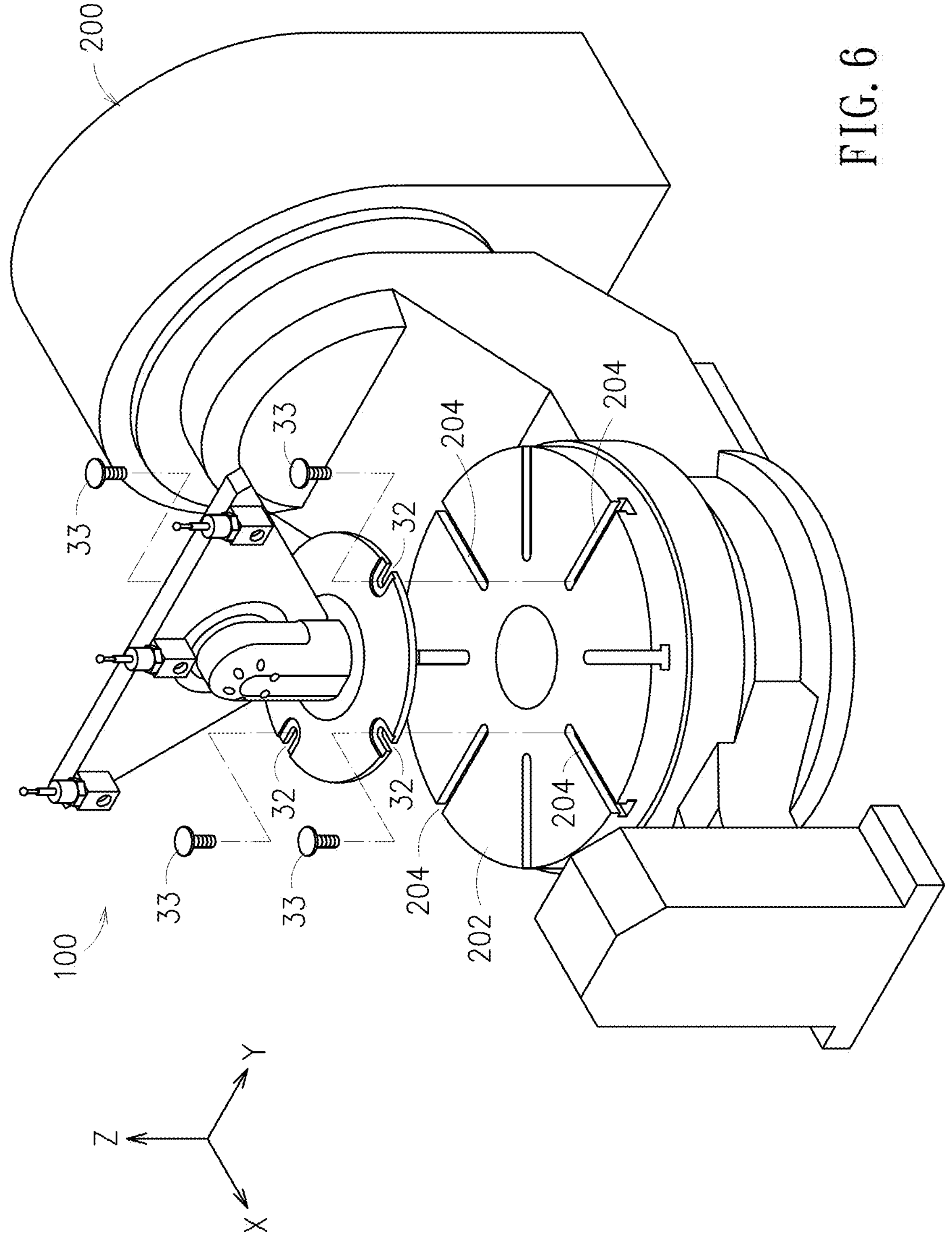
FIG. 6 is a schematic diagram of the structure of the embodiment of FIG. 1 fixed to the working table of a five-axis machine tool.

Referring to FIG. 6, the bolt 33 is inserted through the positioning hole 32 of the base 30 and the groove 204 on the working table 202 of the five-axis machine tool 200, so that the five-axis spatial precision measurement fixture 100 can be detachably mounted on the working table 202 of the five-axis machine tool 200.

The working table 202 is parallel to the XY plane, and the XY plane is composed of the X axis and the Y axis that are perpendicular to each other. The working table 202 is parallel to the Z axis and faces upward. The X axis, Y axis and Z axis are perpendicular to each other.

The working table 202 shown in FIG. 6 is circular, and thus the circular base 30 is concentrically disposed on the working table 202, but is not limited thereto. For example, the base 30 can be disposed eccentrically on the working table 202.

In the embodiment of FIG. 6, the five-axis machine tool 200 is a cradle-type five-axis machine tool. However, the applicable five-axis machine tool of the disclosure is not limited to the cradle-type five-axis machine tools, and the working table 202 is not limited to a circular shape.

Please refer to FIG. 7 to FIG. 10 to illustrate the states of the five-axis spatial precision measurement fixture 100 provided by the disclosure when applied to the working table 202 for different measurement items.

Figure 7:
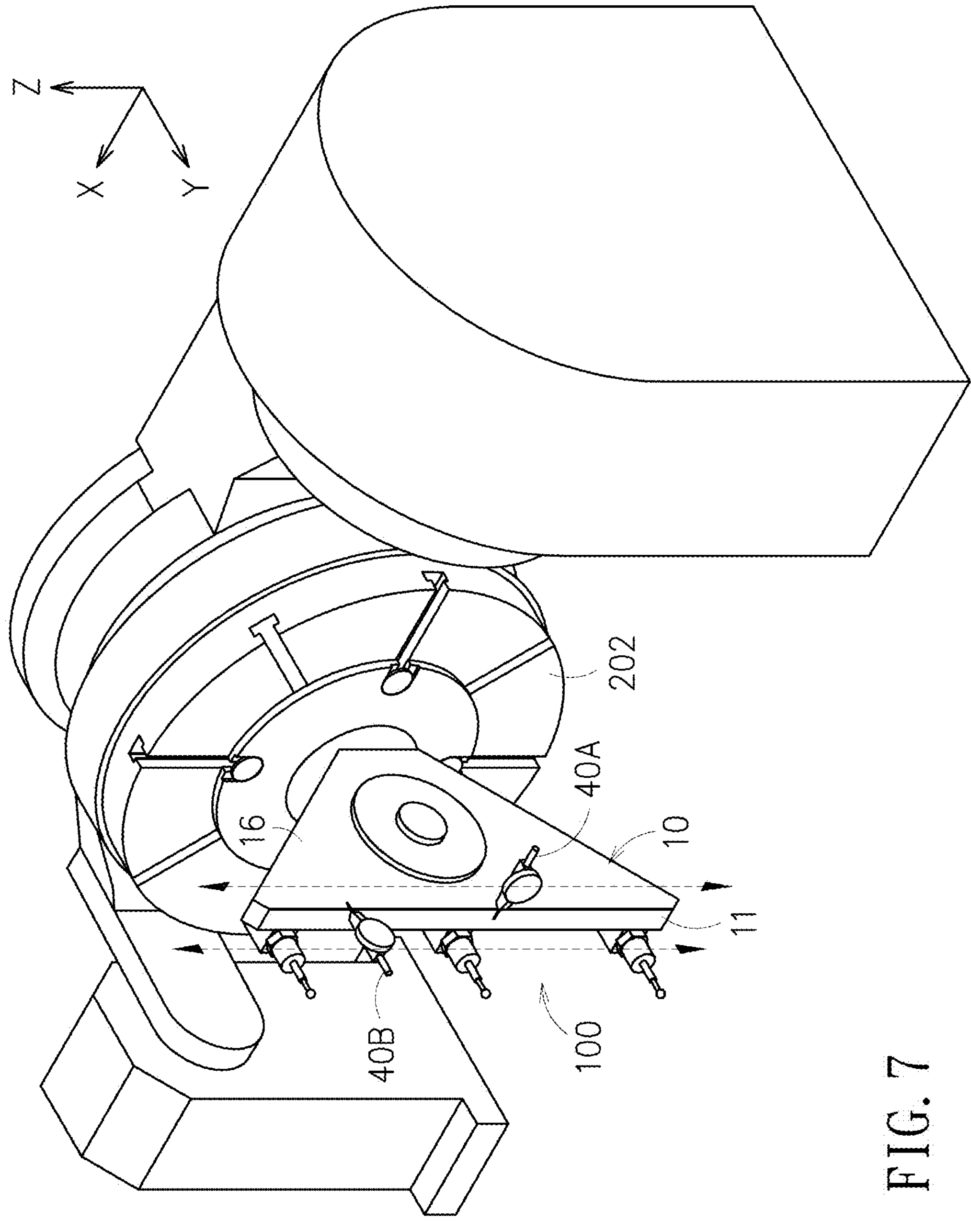
FIG. 7 is a schematic diagram of the three-axis real straightness measurement applied to the working table according to the embodiment of FIG. 1.

Please refer to FIG. 7. The five-axis spatial precision measurement fixture 100 is installed on the working table 202. The working table 202 is parallel to the XZ plane formed by the X axis and the Z axis. The working table 202 is parallel to the Y axis and faces forward. The length direction of the first side 11 of the body 10 is parallel to the Z axis. By applying the needle of a diameter-type multimeter 40A to the first side 11 and moving parallel to the Z axis, and applying the needle of another diameter-type multimeter 40B to the first surface 16 of the body 10 and moving parallel to the Z axis, a three-axis real straightness measurement is performed on the working table 202. Afterwards, error analysis and compensation are performed based on the total measurement data. The diameter-type multimeter 40A or the diameter-type multimeter 40B is not included in the disclosure.

Figure 8:
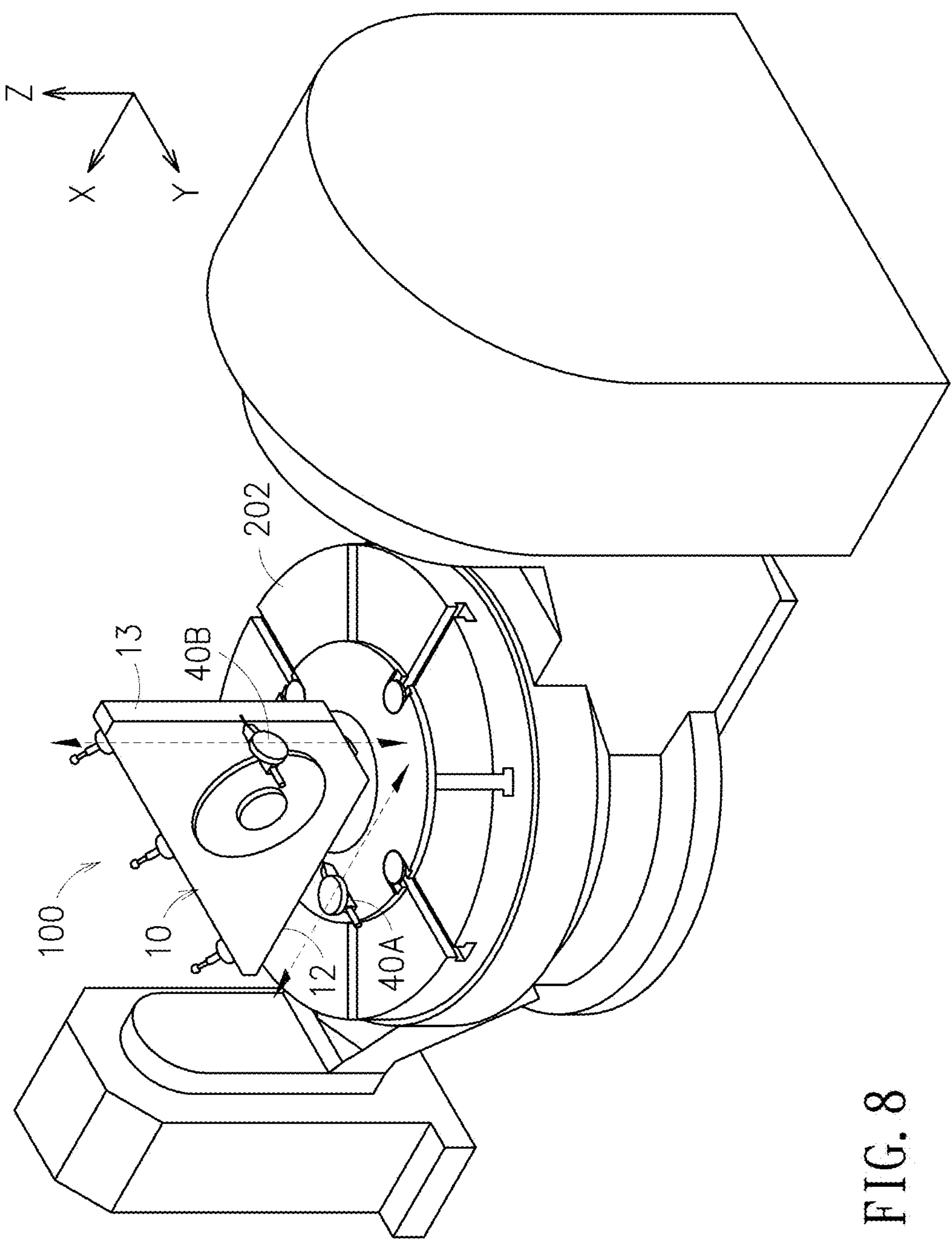
FIG. 8 is a schematic diagram of the three-axis vertical measurement applied to the working table according to the embodiment of FIG. 1.

Please refer to FIG. 8. The five-axis spatial precision measurement fixture 100 is installed on the working table 202. The working table 202 is parallel to the XY plane formed by the X axis and the Y axis. The working table 202 is parallel to the Z axis and faces upward. The length direction of the second side 12 of the body 10 is parallel to the X axis. The length direction of the third side 13 of the body 10 is parallel to the Z axis. By applying the needle of a diameter-type multimeter 40A to the second side 12 and moving parallel to the X axis, and applying the needle of another diameter-type multimeter 40B to the third side 13 and moving parallel to the Z axis, a three-axis real straightness measurement is performed on the working table 202. Afterwards, error analysis and compensation are performed based on the total measurement data. The diameter-type multimeter 40A or the diameter-type multimeter 40B is not included in the disclosure.

Figure 9:
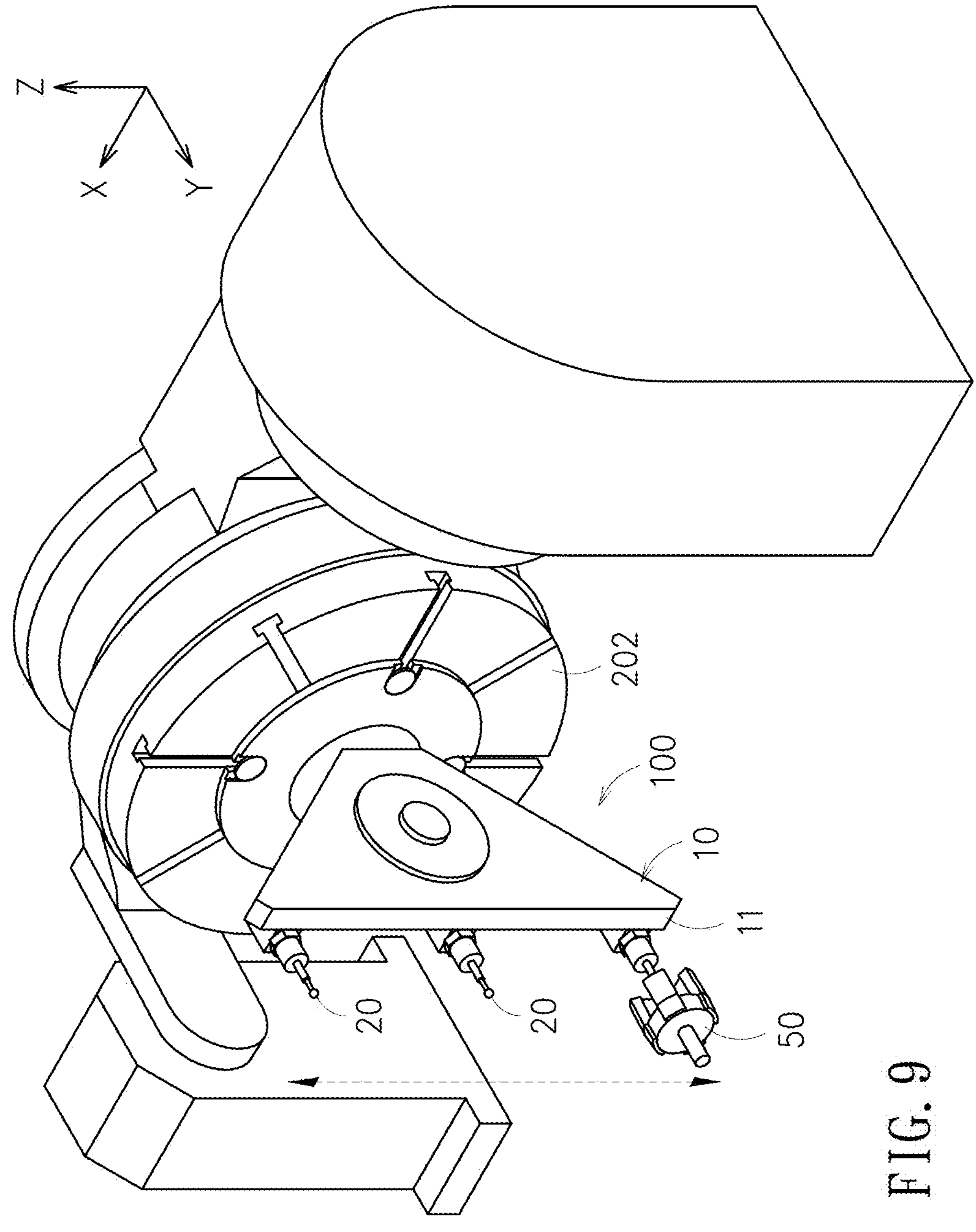
FIG. 9 is a schematic diagram of the three-axis positioning precision measurement applied to the working table according to the embodiment of FIG. 1.

Please refer to FIG. 9. The five-axis spatial precision measurement fixture 100 is installed on the working table 202. The working table 202 is parallel to the XZ plane formed by the X axis and the Z axis. The working table 202 is parallel to the Y axis and faces forward. The length direction of the first side 11 of the body 10 is parallel to the Z axis. A photoelectric measurement module 50 is used to measure each sphere 20, thereby measuring the three-axis positioning accuracy of the working table 202. Afterwards, error analysis and compensation are performed based on the total measurement data. The above photoelectric measurement module 50 is, for example, the sensing head in the invention patent No. I378843 of Republic of China. The photoelectric measurement module 50 is not included in the disclosure.

Figure 10:
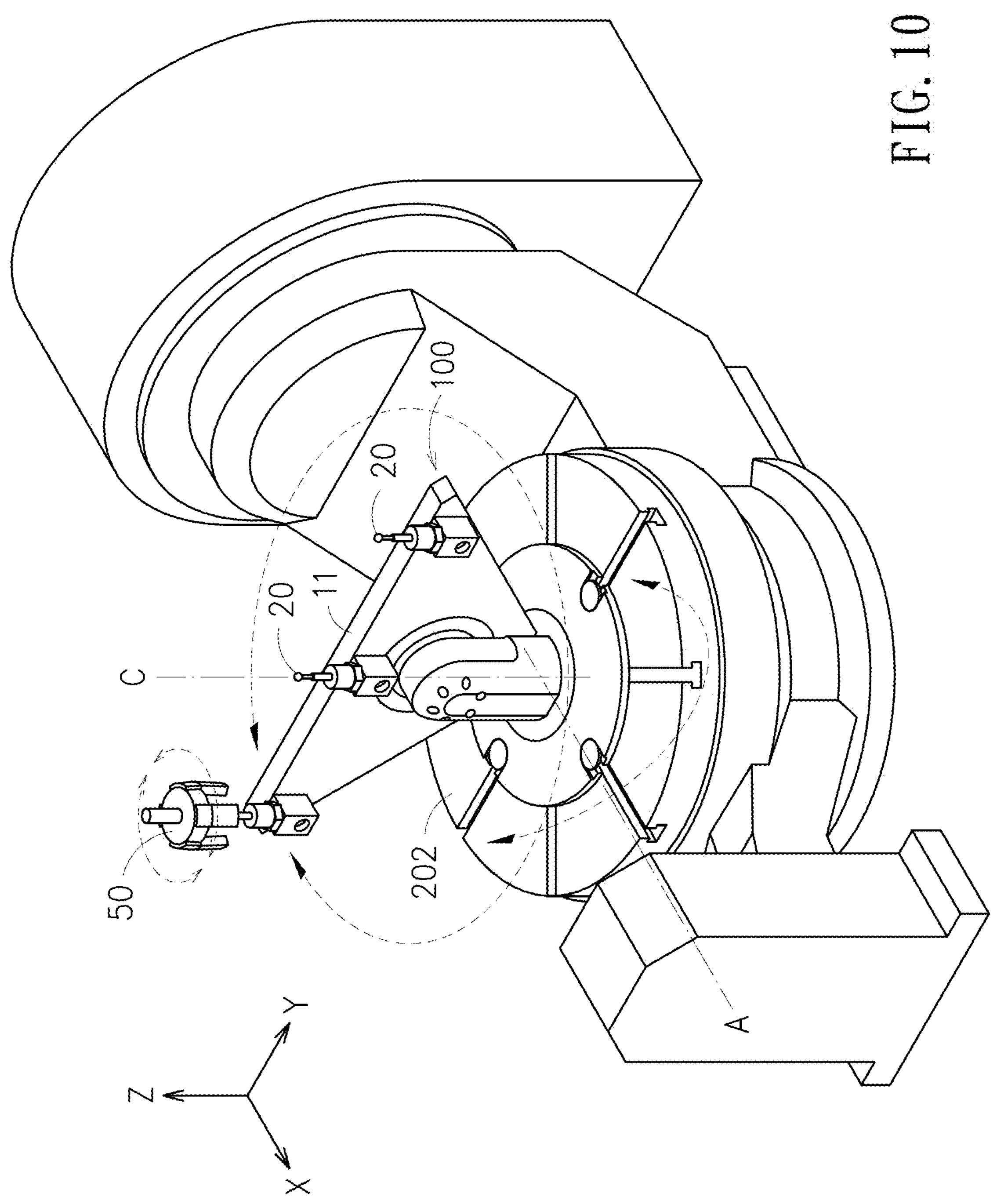
FIG. 10 is a schematic diagram of the error item measurement of the A/C two rotational axes of the working table according to the embodiment of FIG. 1.

Please refer to FIG. 10. The five-axis spatial precision measurement fixture 100 is installed on the working table 202. The working table 202 is parallel to the XY plane formed by the X axis and the Y axis. The working table 202 is parallel to the Z axis and faces upward. The length direction of the first side 11 of the body 10 is parallel to the Y axis. The photoelectric measurement module 50 is used to measure each sphere 20, thereby measuring the rotational axis error items of the A/C axes on the working table 202. Afterwards, error analysis and compensation are performed based on the total measurement data.

Regarding the above two axes A/C, as for the cradle-type five-axis machine tool 200, the axis around which the working table 202 rotates around the X axis is called the A axis, and the axis around which the working table 202 rotates around the Z axis is called the C axis, as the axis A and the axis C illustrated in FIG. 10.

Please refer to FIGS. 11A to 11D. As mentioned above, the number of spheres 20 is not limited to three, but is at least three. In addition, the distance between two adjacent spheres 20 can be equidistant or unequal. To achieve the above purpose, the body 10 may be provided with equidistant or unequal corresponding mounting holes.

Figure 11B:
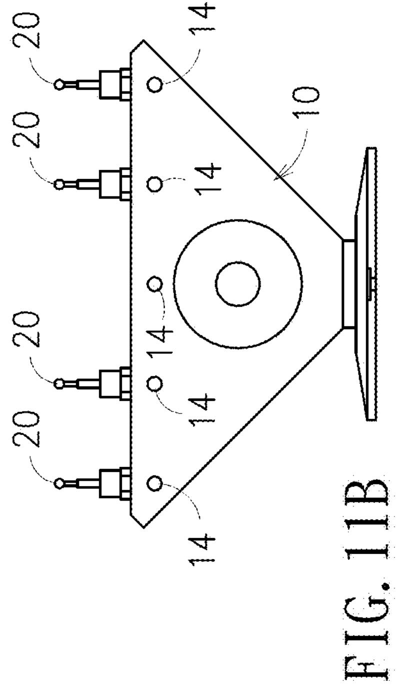
FIG. 11A to FIG. 11D are schematic diagrams of the front view structures associated with the spheres according to different embodiments of the disclosure.
Figure 11D:
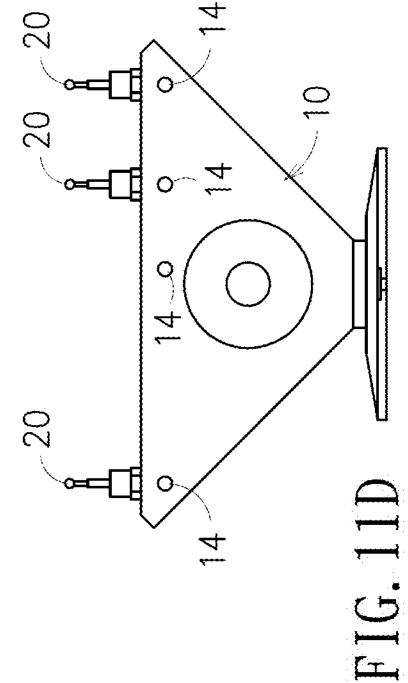
Figure 11A:
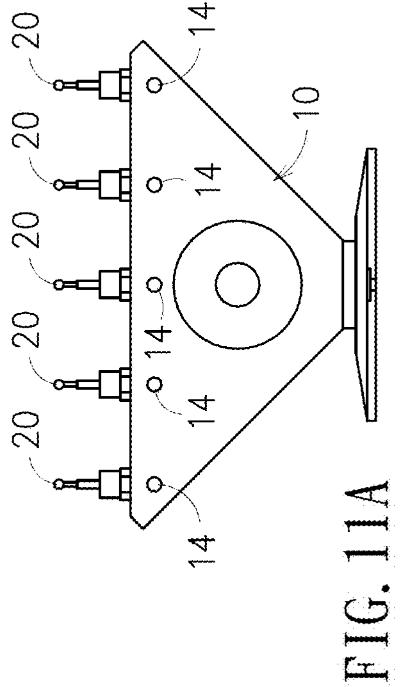

For example, as shown in FIG. 11A, the body 10 is provided with five mounting holes 14 at equal intervals. Each mounting hole 14 is provided with a sphere 20. There are five spheres 20 in total, and the distance between two adjacent spheres 20 is the same.

For example, as shown in FIG. 11B, the body 10 is provided with five mounting holes 14 at equal intervals, but only four of the mounting holes 14 are provided with spheres 20. There are four spheres 20 in total, and the distance between two adjacent spheres 20 is the same or different.

Figure 11C:
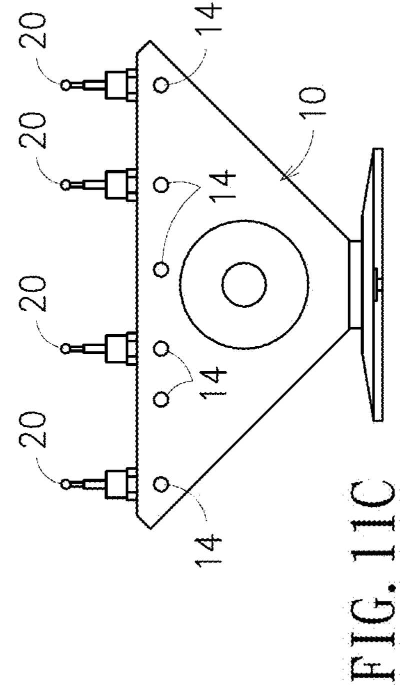

For example, as shown in FIG. 11C, the body 10 is provided with six mounting holes 14 at unequal intervals, but only four of the mounting holes 14 are provided with spheres 20. There are four spheres 20 in total, and the distance between two adjacent spheres 20 is different.

For example, as shown in FIG. 11D, the body 10 is provided with four mounting holes 14 at unequal intervals, but only three of the mounting holes 14 are provided with spheres 20. There are three spheres 20 in total, and the distance between two adjacent spheres 20 is different.

Based on the foregoing, the five-axis spatial precision measurement fixture provided by the disclosure has a specially designed triangular structure to match the position and installment of at least three spheres. It can measure at least 28 sets of data with the largest percentage of error in a single positioning, and can achieve the greatest accuracy improvement effect in the shortest time. There is no need to move the fixture during the measurement process. It can quickly and accurately measure the spatial geometric error of 5-axis machine tools, which can be used as the basis of interpolation data. The three-axis straightness and two-axis angular motion measurements can be shared, to quickly and accurately measure the spatial geometric error of the five-axis machine tools as the basis of interpolating computational data.

This disclosure uses the establishment of high-precision fixtures as a basis to measure the relative precision of machine tools for significantly reducing the cost of laser equipment. In addition, the photoelectric non-contact measurement technology and simplified processes are utilized by the disclosure to avoid human measurement errors and accelerate measurement efficiency.

Although the disclosure has been disclosed in the form of embodiments, it is not intended to limit the present disclosure. Anyone with general knowledge in the field of technology may make some changes and modifications without departing from the spirit and scope of the present disclosure, and therefore the scope of protection of the disclosure shall be subject to the scope of the patent application attached hereto.

What is claimed is:

1. A five-axis spatial precision measurement fixture, comprising:
   - a body, having a first side, a second side and a third side, wherein the first side is parallel to a first direction and has two opposite ends, the second side and the third side are connected to the opposite ends of the first side respectively, there is a first included angle between the first side and the second side, there is a second included angle between the first side and the third side, there is a third included angle between the second side and the third side, the first included angle and the second included angle are both 45 degrees, and the third included angle is 90 degrees, at least three mounting holes are provided on a first surface of the body, a center line of the at least three mounting holes is parallel to the first direction, and distances between centers of any two adjacent mounting holes are the same; and
   - a base, wherein the body is pivotably disposed on the base, a pivot axis of the body is parallel to a third direction, and the first direction and the third direction are perpendicular to each other.

2. The five-axis spatial precision measurement fixture according to claim 1, wherein axis directions of the at least three mounting holes are all parallel to the third direction.

3. The five-axis spatial precision measurement fixture according to claim 1, wherein a top of the base is provided with a cylinder, and the body is pivoted on the cylinder.

4. The five-axis spatial precision measurement fixture according to claim 1, wherein a bottom of the base is provided with a plurality of positioning holes.

5. The five-axis spatial precision measurement fixture according to claim 1, wherein the first surface is perpendicular to a plane formed by the first direction and the third direction, and a periphery of the first surface is adjacent to the first side, the second side and the third side.

* * * * *